United States Patent
Li et al.

(10) Patent No.: US 8,963,460 B2
(45) Date of Patent: Feb. 24, 2015

(54) METHOD AND SYSTEM FOR CONTROLLING MOTOR

(71) Applicant: General Electric Company, Schenectady, NY (US)

(72) Inventors: Yong Li, Shanghai (CN); Pengju Kang, Yorktown Heights, NY (US); Ronghui Zhou, Shanghai (CN); Xiangming Shen, Shanghai (CN); Xiao Chen, Gan Su (CN); Zili Cai, Shanghai (CN); Tong Zhao, Shanghai (CN)

(73) Assignee: General Electric Company, Schenectady, NY (US)

( * ) Notice: Subject to any disclaimer, the term of this patent is extended or adjusted under 35 U.S.C. 154(b) by 135 days.

(21) Appl. No.: 13/673,240

(22) Filed: Nov. 9, 2012

(65) Prior Publication Data

US 2013/0119904 A1 May 16, 2013

(30) Foreign Application Priority Data

Nov. 10, 2011  (CN) .......................... 2011 1 0355846

(51) Int. Cl.
| | |
|---|---|
| H02P 21/00 | (2006.01) |
| H02P 6/14 | (2006.01) |
| B60L 15/02 | (2006.01) |

(52) U.S. Cl.
CPC ............ *H02P 6/145* (2013.01); *H02P 21/0003* (2013.01); *B60L 15/025* (2013.01); *B60L 2240/423* (2013.01); *B60L 2240/427* (2013.01); *Y02T 10/643* (2013.01)
USPC ............ 318/400.02; 318/400.14; 318/400.15; 318/721; 318/799; 318/432; 388/800; 388/819

(58) Field of Classification Search
CPC ..................................... H02P 1/42; H02P 7/29
USPC ............ 318/400.01, 400.02, 400.07, 400.14, 318/400.15, 400.23, 701, 721, 727, 799, 318/801, 805, 809, 811, 430, 432, 437, 318/800; 388/800, 819
See application file for complete search history.

(56) References Cited

U.S. PATENT DOCUMENTS

| | | | |
|---|---|---|---|
| 6,590,312 | B1 | 7/2003 | Seguchi et al. |
| 7,733,044 | B2 | 6/2010 | Nakamura et al. |

(Continued)

FOREIGN PATENT DOCUMENTS

| | | |
|---|---|---|
| EP | 1263125 A2 | 12/2002 |
| JP | H10108499 A | 4/1998 |
| WO | 2010055168 A2 | 5/2010 |

OTHER PUBLICATIONS

EP Search Report and Written Opinion issued Apr. 25, 2014 in connection with corresponding EP Patent Application No. 12191698.5.

(Continued)

*Primary Examiner* — Antony M Paul
(74) *Attorney, Agent, or Firm* — GE Global Patent Operation; Peter T. DiMauro

(57) ABSTRACT

A method for controlling a motor is provided. The method comprises obtaining electrical signals of the motor with a signal unit, the electrical signals comprising a motor torque and an angular velocity, calculating a voltage phase angle of a voltage vector with a calculating component, wherein a command torque, the motor torque, the angular velocity and a voltage amplitude of the voltage vector are inputs of the calculating component, and wherein the voltage phase angle is a variable and the voltage amplitude is a constant. The method further comprises modulating the voltage phase angle and the voltage amplitude to a switching signal for controlling an inverter; converting a direct current voltage to the voltage vector according to the switching signal, and applying the voltage vector to the motor.

16 Claims, 2 Drawing Sheets

(56) References Cited

U.S. PATENT DOCUMENTS

| | | |
|---|---|---|
| 7,774,148 B2 | 8/2010 | Welchko et al. |
| 7,928,686 B2 | 4/2011 | Saha et al. |
| 8,269,439 B2 * | 9/2012 | Itoh .......................... 318/400.09 |
| 2009/0237013 A1 | 9/2009 | Sato |
| 2010/0013421 A1 * | 1/2010 | Itoh .......................... 318/400.09 |
| 2010/0308757 A1 | 12/2010 | Ide et al. |
| 2011/0248663 A1 * | 10/2011 | Yamakawa et al. ........... 318/805 |

OTHER PUBLICATIONS

Ozcira: "Direct Torque Control of Permanent Magnet Synchronous Motors", Torque Control pp. 129-153; Feb. 2011, Yildiz Technical University Turkey.

Nakai: "Development and testing of the torque control for the permanent-magnet synchronous motor" IEEE Transactions on Industrial Electronics, pp. 800-806, vol. 52, Issue: 3; May 31, 2005; pp. 109-115; Sep. 7-10, 2009.

Gui-Jia Su: "Extended constant-torque and constant-power speed range control of permanent magnet machine using a current source inverter" Vehicle Power and Propulsion Conference, 2009. VPPC '09. IEEE.

Kadjoudj: "Modified Direct Torque Control of Permanent Magnet Synchronous Motor Drives", International Journal of Sciences and Techniques of Automatic control & computer engineering—pp. 167-180, vol. 1. Dec. 2007.

* cited by examiner

METHOD AND SYSTEM FOR CONTROLLING MOTOR

BACKGROUND OF THE INVENTION

Embodiments of the invention generally relate to a method and system for controlling a motor, and more particularly to a method and system for controlling an alternating current (AC) motor outputting a motor torque changing linearly with respect to a voltage phase angle of a voltage vector applied thereto.

An AC motor is controlled by a voltage vector outputted from a control system and generates a motor torque for driving wheels of a hybrid vehicle or an electric vehicle. The voltage vector is generated through converting a direct current (DC) voltage from a DC power source. The motor torque changes with a voltage amplitude and a voltage phase angle of the voltage vector. Currently, the motor torque is controlled through regulating both the voltage amplitude and the voltage phase angle. However, it's difficult to determine a good point of the voltage amplitude and the voltage phase angle to ensure that the motor torque is as high as possible to ensure the DC bus voltage utilization rate.

For example, an approach to improve the motor torque and the DC bus voltage utilization rate comprises fixing the voltage amplitude and varying the voltage phase angle so that the motor torque is controlled only through changing the voltage phase angle. For example, see Hideo Nakai et al., "Development and testing of the torque control for the permanent-magnet synchronous motor," in IEEE Transactions on Industrial Electronics, Vol. 52, No. 3, June 2005. However, in this approach, the motor torque changes nonlinearly with the voltage phase angle. A shortcoming of this approach is that it cannot quickly and continuously calculate and control the motor torque.

It is desirable to provide a method and system for controlling a motor to address at least some of the above-mentioned problems.

BRIEF DESCRIPTION OF THE INVENTION

According to an embodiment of the present invention, a method for controlling a motor is provided. The method comprises: obtaining electrical signals of the motor with a signal unit, the electrical signals comprising a motor torque and an angular velocity; calculating a voltage phase angle of a voltage vector with a calculating component, wherein a command torque, the motor torque, the angular velocity and a voltage amplitude of the voltage vector are inputs of the calculating component, and wherein the voltage phase angle is a variable and the voltage amplitude is a constant; modulating, with a modulator, the voltage phase angle and the voltage amplitude to a switching signal for controlling an inverter; converting, with the inverter, a direct current voltage to the voltage vector according to the switching signal; and applying the voltage vector to the motor; wherein the motor torque generated from the motor changes linearly with respect to the voltage phase angle at a certain value of the angular velocity of the motor and a certain monotonous range of the voltage phase angle.

According to another embodiment of the present invention, a method for controlling a motor torque generated from a motor is provided. The method comprises: fixing a voltage amplitude of a voltage vector outputted from an inverter; and changing a voltage phase angle of the voltage vector to control the motor torque, wherein the motor torque changes linearly with respect to the voltage phase angle at a certain value of an angular velocity of the motor and a certain monotonous range of the voltage phase angle.

According to another embodiment of the present invention, a control system for controlling a motor is provided. The control system comprises: a signal unit for outputting electrical signals of the motor, the electrical signals comprising a motor torque and an angular velocity; and a controller coupled to the signal unit and comprising a calculating component configured to calculate a voltage phase angle of a voltage vector, wherein inputs of the calculating component comprise a command torque, the motor torque, the angular velocity, wherein a voltage amplitude of the voltage vector is a constant and wherein an output of the calculating component is the voltage phase angle; wherein the motor torque changes linearly with respect to the voltage phase angle at a certain value of the angular velocity of the motor and a certain monotonous range of the voltage phase angle.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION OF THE INVENTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

Figure 1:
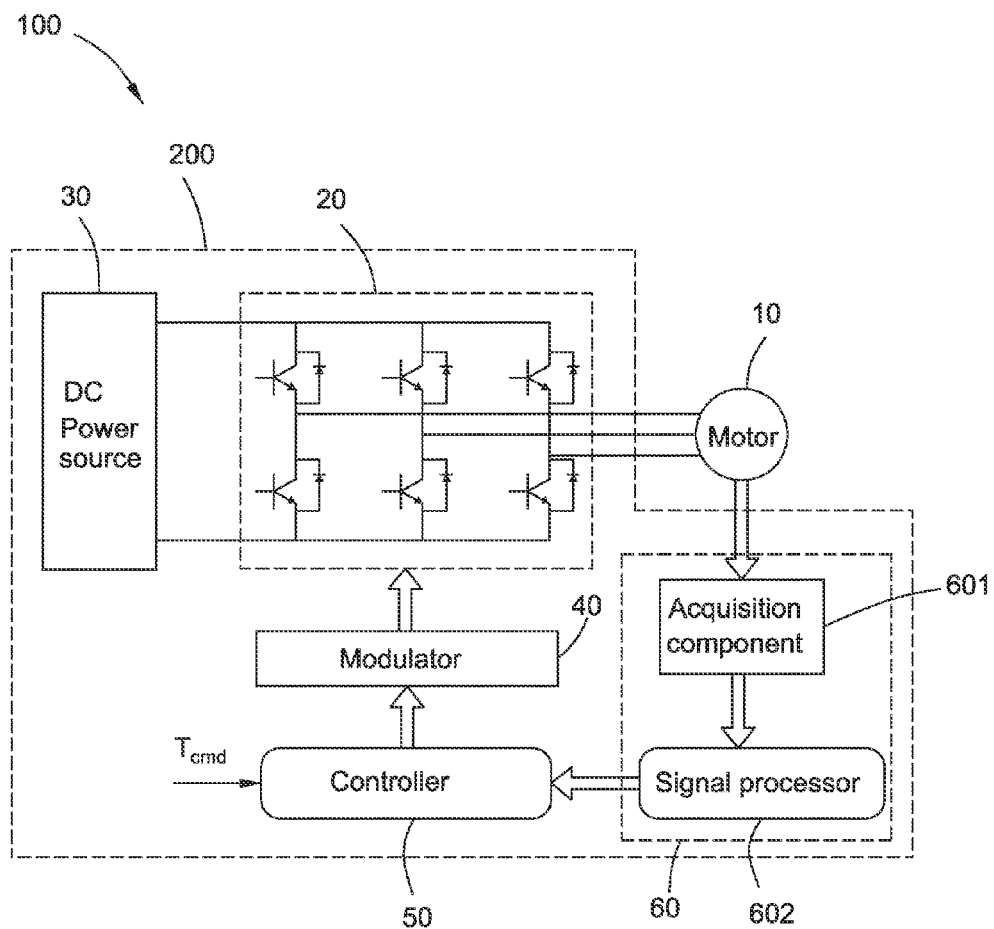
FIG. 1 is a schematic basic block diagram of a motor system in accordance with an exemplary embodiment.

FIG. 1 illustrates a schematic block diagram of a motor system 100 in accordance with an exemplary embodiment. In FIG. 1, the motor system 100 generally includes a motor 10 and a control system 200 controlling the motor 10. The control system 200 includes an inverter 20 coupled to the motor 10, a direct current (DC) power source 30 coupled to the inverter 20, a modulator 40 coupled to the inverter 20, a controller 50 coupled to the modulator 40, and a signal unit 60 coupled to the controller 50.

The signal unit 60 is configured to obtain electrical signals of the motor 10. The electrical signals comprise a motor torque, $T_{em}$, and an angular velocity, $\omega$, of the motor 10 besides others such as motor currents and motor voltages. Some electrical signals such as motor currents and motor voltages are acquired only through detecting and some electrical signals such as the motor torque, $T_{em}$, and the angular velocity, ω, may be acquired through detecting or calculating. According to an embodiment, the control system 200 comprises at least one sensor (not shown) coupled to the motor 10 and the signal unit 60 has an acquisition component 601 coupled to the sensor. The sensors are configured to detect the electrical signals of the motor 10. The acquisition component 601 is configured to receive the electrical signals, convert the electrical signals to dates which can be processed by the controller 50 and provide the dates to the controller 50. The motor torque, $T_{em}$, and the angular velocity, ω, are acquired through detecting.

According to another embodiment, the signal unit 60 further comprises a signal processor 602 coupled to the acquisition component 601 and the controller 50 for calculating the electrical signals based on parameters of the motor 10 such as the number of pole pairs, inductances, flux linkage and so on. The sensors detect the motor currents, the motor voltages and so on and then the acquisition component 601 provides them to the signal processor 602. The signal processor 602 calculates the motor torque, $T_{em}$, and the angular velocity, ω, based on the motor currents, the motor voltages and so on.

The motor torque, $T_{em}$, and the angular velocity, ω, are inputted into the controller 50. The controller 50 is configured to provide a voltage phase angle, φ, and a voltage amplitude, V, of a voltage vector to the modulator 40. The voltage phase angle, φ, is a variable and the voltage amplitude, V, is a constant. The controller 50 has a calculating component configured to calculate the voltage phase angle, φ. Inputs of the calculating component comprise a command torque, $T_{cmd}$, the motor torque, $T_{em}$, the angular velocity, ω, and the voltage amplitude, V, of the voltage vector. A calculated value of the voltage phase angle, φ, is inputted back into the calculating component to calculate another value of the voltage phase, φ.

The modulator 40 is configured to modulate the voltage phase angle, φ, and the voltage amplitude, V, to a switching signal controlling the inverter 20. A voltage signal outputted from the inverter 20 can be considered the voltage vector. The inverter 20 converts a DC voltage of the DC power source 30 to the voltage vector applied to the motor 10 according to the switching signal. The voltage vector outputted from the inverter 20 is a rectangular-ware voltage. The motor 10 is an alternating current (AC) motor that generates the motor torque, $T_{em}$, for driving wheels of a hybrid vehicle or an electric vehicle. The motor 10 is a multi-phase motor such as 3-phase Permanent Magnet (PM) motor, other multi-phase PM motor, 3-phase induction motor, other multi-phase induction motor and so on.

Figure 2:
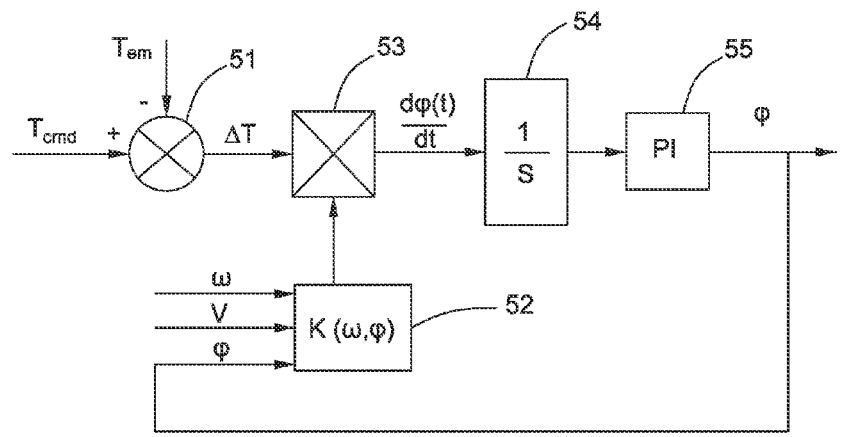
FIG. 2 is a block diagram of an exemplary calculating component in a controller for use in the motor system of FIG. 1 according to an embodiment of the present invention.

FIG. 2 is a block diagram of an exemplary calculating component. The calculating component calculates such a voltage phase angle φ that the motor 10 can output the motor torque, $T_{em}$, being equal to or approximating the command torque, $T_{cmd}$. The voltage amplitude, V, is fixed and the voltage phase angle, φ, is changed to control the motor torque, $T_{em}$. The calculating component includes an adder 51, a function module 52, a multiplier 53 and an integrator 54.

The adder 51 calculates a torque deviation, ΔT, between the command torque, $T_{cmd}$, and the motor torque, $T_{em}$. The angular velocity, ω, the voltage amplitude, V, and the voltage phase angle, φ, are inputted into the function module 52 to calculate a value of the gain function, K(ω, φ), from the following equations (1):

$$K(\omega, \varphi) = \frac{C\omega^2}{2B\cos 2\varphi - A\omega\sin\varphi} \quad (1)$$

-continued
$$A = -\frac{3}{2}P_n V \psi_f L_q, \ B = -\frac{3}{2}P_n V^2 (L_d - L_q), \ C = 2L_d L_q$$

Where, $P_n$, is the number of pole pairs of the motor 10; $\psi_f$ is a flux linkage of the motor 10; and $L_d$, and, $L_q$, are dq-axis inductances of the motor 10. $P_n$, $\psi_f$, $L_d$, and $L_q$ are constants. The angular velocity, ω, and the voltage phase angle, φ, are variables. The voltage amplitude, V, is fixed at a maximum value of a fundamental wave voltage of the rectangular-ware voltage. The voltage amplitude, V, is equal to $$\frac{2}{\pi}V_{dc},$$

where $V_{dc}$ is a DC voltage outputted from the DC power source 30.

The multiplier 53 is coupled to the adder 51 and the function module 52 and multiplies the torque deviation, ΔT, and the value of the gain function, K(ω, φ), to obtain a derivative of the voltage phase angle with respect to time $$\frac{d\varphi(t)}{dt}$$

expressed by the following expression (2):

$$\frac{d\varphi(t)}{dt} = K(\omega, \varphi)\Delta T \quad (2)$$

Expression (2) can be converted into Expression (3):

$$\frac{d\varphi(t)}{dt} = K(\omega, \varphi)\frac{dT_{em}}{dt} \quad (3)$$

The integrator 54 is coupled to the multiplier 53 and integrates the derivative of the voltage phase angle, $$\frac{d\varphi(t)}{dt},$$

to obtain me voltage phase angle, φ. The voltage phase angle, φ, is adjusted based on the torque deviation, ΔT, of the motor torque, $T_{em}$, from the command torque, $T_{cmd}$, with the gain function, K(ω, φ). The calculating component further comprises a proportional-integral compensator 55 coupled to the integrator 54 for accelerating integral convergence.

The motor torque $T_{em}$ generated from the motor 10 changes approximately a sine curve with the voltage phase angle, φ, under a certain value of the angular velocity, ω. Thereby the motor torque, $T_{em}$, changes linearly with respect to the voltage phase angle, φ, at a certain value of the angular velocity, ω, of the motor 10 and a certain monotonous range of the voltage phase angle, φ. The certain monotonous range of the voltage phase angle, φ, varies with the angular velocity ω. For different angular velocities, ω, the monotonous ranges of the voltage phase angle, φ, are different. In a short time sampling period, however, the angular velocity, ω, can be seen as a constant. The certain monotonous range of the voltage phase angle, φ, is obtained from the following inequality (4) wherein a derivative of the motor torque with respect to the voltage phase angle is equal to or larger than zero.

$$\frac{\partial T_{em}}{\partial \varphi} \geq 0 \qquad (4)$$

The following inequality (5) can be derived from the inequality (4).

$$\frac{\psi_f \omega L_q - \sqrt{(\psi_f \omega L_q)^2 + 8((L_d - L_q)V)^2}}{4(L_d - L_q)V} \leq \qquad (5)$$

$$\sin\varphi \leq \frac{\psi_f \omega L_q + \sqrt{(\psi_f \omega L_q)^2 + 8((L_d - L_q)V)^2}}{4(L_d - L_q)V}$$

The certain monotonous range of the voltage phase angle, φ, is in symmetry with $$\frac{\pi}{2},$$

so:

$$\varphi_{min} = \arcsin\frac{\psi_f \omega L_q - \sqrt{(\psi_f \omega L_q)^2 + 8((L_d - L_q)V)^2}}{4(L_d - L_q)V} \qquad (6)$$

$$\varphi_{max} = \pi - \varphi_{min}$$

The voltage phase angle, φ, is limited in the certain monotonous range to ensure the stability of the motor torque, $T_{em}$.

To ensure the motor torque, $T_{em}$, stability, the gain function, K(ω, φ), is larger than zero, which leads to:

$$\frac{-\psi_f \omega L_q - \sqrt{(\psi_f \omega L_q)^2 + 32V^2(L_d - L_q)^2}}{8V(L_d - L_q)} < \qquad (7)$$

$$\sin\varphi < \frac{-\psi_f \omega L_q + \sqrt{(\psi_f \omega L_q)^2 + 32V^2(L_d - L_q)^2}}{8V(L_d - L_q)}$$

Figure 3:
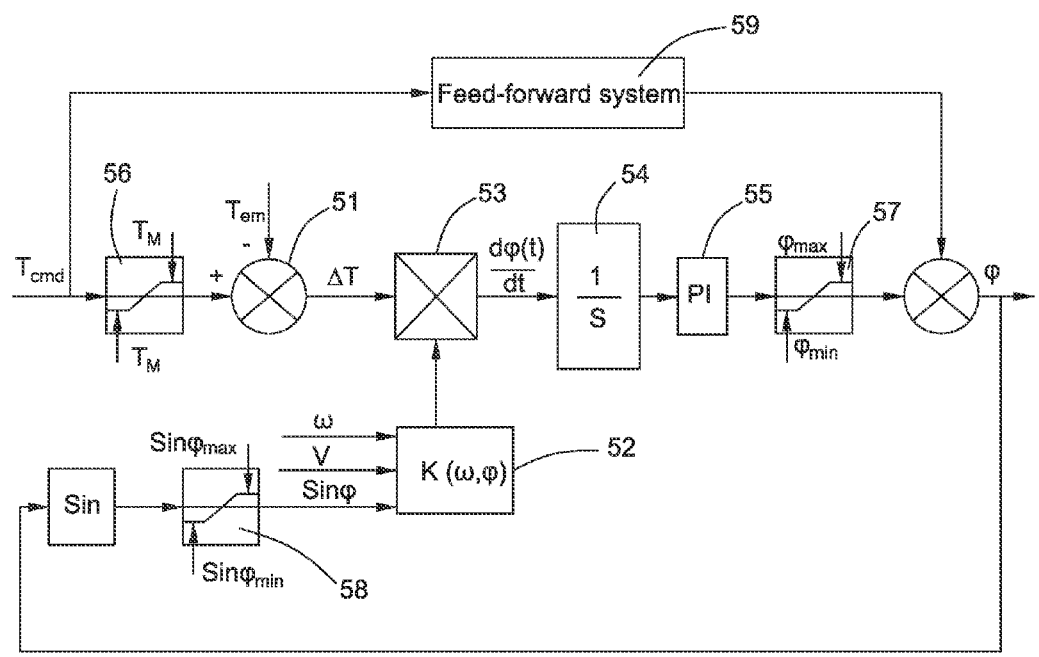
FIG. 3 is a block diagram of an exemplary calculating component in a controller for use in the motor system of FIG. 1 according to an embodiment of the present invention.

FIG. 3 is a block diagram of another embodiment of a calculating component. In this embodiment, the calculating component further comprises three limiters 56, 57 and 58. The command torque, $T_{cmd}$, is limited through a first limiter 56 by an available maximum torque, $T_M$, of the motor 10 before calculating the torque deviation, ΔT. The voltage phase angle, φ, outputted from the proportional-integral compensator 55 is limited through a second limiter 57 by the $\phi_{max}$ and $\phi_{min}$ to ensure the voltage phase angle, φ, is in the monotonous range. Before the voltage phase angle, φ, is inputted into the gain function, K(ω, φ), a sine value of the voltage phase angle, φ, is calculated and the sine value is limited through a third limited 58 by sin $\phi_{max}$ and sin $\phi_{min}$, wherein sin $\phi_{max}$ and sin $\phi_{min}$ is obtained from the inequality (7) expressed by the following equations (8):

$$\sin\varphi_{max} = \frac{-\psi_f \omega L_q + \sqrt{(\psi_f \omega L_q)^2 + 32V^2(L_d - L_q)^2}}{8V(L_d - L_q)} \qquad (8)$$

$$\sin\varphi_{min} = \frac{-\psi_f \omega L_q - \sqrt{(\psi_f \omega L_q)^2 + 32V^2(L_d - L_q)^2}}{8V(L_d - L_q)}$$

so as to ensure that the gain function, K(ω, φ), is larger than zero.

The calculating component further comprises a feed-forward system 59 parallel to the adder 51, the multiplier 53, the integrator 54, and the proportional-integral compensator 55. The command torque, $T_{cmd}$, is also inputted into the feed-forward system 59 and an output of the feed-ward system 59 is added by an output of the proportional-integral compensator 55 to obtain the voltage phase angle, φ. The feed-forward system 59 uses a feed-forward look-up table to minimize the calculating time.

The motor torque, $T_{em}$, is controlled only through regulating the voltage phase angle, φ, since the voltage amplitude, V, is fixed, so as to control the motor torque, $T_{em}$, and drive the motor 10. The voltage amplitude, V, is fixed at the maximum value of the fundamental wave voltage of the rectangular-ware voltage, so as to choose the voltage phase angle, φ, to ensure the motor torque maximum. Thereby, the DC bus voltage utilization rate is improved. Additionally, the motor torque, $T_{em}$, changes linearly with respect to the voltage phase angle, φ, at a certain value of the angular velocity, ω, and a certain monotonous range of the voltage phase angle, φ, so as to quickly and continuously control the motor torque, $T_{em}$.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. The various features described, as well as other known equivalents for each feature, can be mixed and matched by one of ordinary skill in this art to construct additional systems and techniques in accordance with principles of this disclosure.

What is claimed is:

1. A method for controlling a motor, the method comprising:
    obtaining electrical signals of the motor with a signal unit, the electrical signals comprising a motor torque and an angular velocity;

calculating a voltage phase angle of a voltage vector with a calculating component, wherein a command torque, the motor torque, the angular velocity and a voltage amplitude of the voltage vector are inputs of the calculating component, and wherein the voltage phase angle is a variable and the voltage amplitude is a constant;

modulating, with a modulator, the voltage phase angle and the voltage amplitude to form a switching signal for controlling an inverter;

converting, with the inverter, a direct current voltage to the voltage vector according to the switching signal; and applying the voltage vector to the motor;

wherein the motor torque generated from the motor changes linearly with respect to the voltage phase angle at a certain value of the angular velocity of the motor and a certain monotonous range of the voltage phase angle.

2. The method of claim 1, wherein the voltage vector outputted from the inverter is a rectangular-wave voltage, and wherein the voltage amplitude is fixed at a maximum value of a fundamental wave voltage of the rectangular-ware voltage.

3. The method of claim 1, wherein the certain monotonous range of the voltage phase angle varies with respect to the angular velocity.

4. The method of claim 3, wherein the certain monotonous range of the voltage phase angle is obtained from a derivative of the motor torque with respect to the voltage phase angle, wherein the derivative of the motor torque is equal to or larger than zero.

5. The method of claim 1, wherein the voltage phase angle is adjusted based on a torque deviation of the motor torque from the command torque with a gain function.

6. The method of claim 5, wherein the gain function is larger than zero.

7. The method of claim 1, wherein the calculating a voltage phase angle of a voltage vector with a calculating component comprises limiting the command torque by an available maximum torque of the motor.

8. The method of claim 1, wherein the calculating a voltage phase angle of a voltage vector with a calculating component further comprises inputting the command torque into a feed-forward system.

9. A method for controlling a motor torque generated from a motor, the method comprising:

fixing a voltage amplitude of a voltage vector outputted from an inverter; and changing a voltage phase angle of the voltage vector to control the motor torque, wherein the motor torque changes linearly with respect to the voltage phase angle at a certain value of an angular velocity of die motor and a certain monotonous range of the voltage phase angle, wherein the certain monotonous range of the voltage phase angle varies with respect to the angular velocity, wherein the certain monotonous range of the voltage phase angle is obtained from a derivative of the motor torque with respect to the voltage phase angle, wherein the derivative of the motor torque is equal to or larger than zero.

10. The method of claim 9, wherein the voltage vector outputted from the inverter is a rectangular-wave voltage, and wherein the voltage amplitude is fixed at a maximum value of a fundamental wave voltage of the rectangular-ware voltage.

11. A control system for controlling a motor, the control system comprising:

a signal unit far outputting electrical signals of the motor, the electrical signals comprising a motor torque and an angular velocity; and a controller coupled to the signal unit and comprising a calculating component configured to calculate a voltage phase angle of a voltage vector, wherein inputs of the calculating component comprise a command torque, the motor torque, the angular velocity, wherein a voltage amplitude of the voltage vector is a constant and wherein an output of the calculating component is the voltage phase angle;

wherein the motor torque changes linearly with respect to the voltage phase angle at a certain value of the angular velocity of the motor and a certain monotonous range of the voltage phase angle, wherein the certain monotonous range of the voltage phase angle varies with respect to the angular velocity, wherein the certain monotonous range of the voltage phase angle is obtained from a derivative of the motor torque with respect to the voltage phase angle, wherein the derivative of the motor torque is equal to or larger than zero.

12. The control system of claim 11, further comprising:

a modulator coupled to the controller, the modulator configured to modulate the voltage phase angle and the voltage amplitude to form a switching signal; and an inverter coupled to the modulator and controlled by the switching signal, wherein the inverter is configured to convert, a direct current voltage to the voltage vector applied to the motor.

13. The control system of claim 12, wherein the voltage vector outputted from the inverter is a rectangular-wave voltage, and wherein the voltage amplitude is fixed at a maximum value of a fundamental wave voltage of the rectangular-ware voltage.

14. The control system of claim 11, wherein the calculating component comprises:

an adder configured to calculate a torque deviation between the command torque and the motor torque;

a function module configured to receive the angular velocity, the voltage amplitude and the voltage phase angle as inputs and to calculate a value of a gain function;

a multiplier coupled to the adder and the function module and configured to multiply the torque deviation and the value of the gain function to obtain a derivative of the voltage phase angle with respect to time; and an integrator coupled to the multiplier and configured to integrate the derivative of the voltage phase angle to obtain the voltage phase angle.

15. The control system of claim 14, wherein the calculating component further comprises a proportional-integral compensator coupled to the integrator and configured to accelerate integral convergence.

16. The control system of claim 15, wherein the calculating component further comprises a feed-forward system parallel to the adder, the multiplier, the integrator and the proportional-integral compensator.

* * * * *